United States Patent
Dai et al.

(10) Patent No.: US 9,350,260 B2
(45) Date of Patent: May 24, 2016

(54) STARTUP METHOD AND SYSTEM FOR RESONANT CONVERTERS

(71) Applicant: FutureWei Technologies, Inc., Plano, TX (US)

(72) Inventors: Heping Dai, Plano, TX (US); Daoshen Chen, Allen, TX (US); Xujun Liu, Shenzhen (CN); Liming Ye, Frisco, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 205 days.

(21) Appl. No.: 14/074,194

(22) Filed: Nov. 7, 2013

(65) Prior Publication Data
US 2015/0124488 A1    May 7, 2015

(51) Int. Cl.
H02M 3/335 (2006.01)
H02M 3/337 (2006.01)
H02M 1/36 (2007.01)
H02M 1/00 (2006.01)

(52) U.S. Cl.
CPC .............. *H02M 3/3376* (2013.01); *H02M 1/36* (2013.01); *H02M 2001/0058* (2013.01)

(58) Field of Classification Search
USPC .......... 363/21.02, 21.03, 21.06, 21.11, 21.14, 363/21.18, 39–41, 78
See application file for complete search history.

(56) References Cited

U.S. PATENT DOCUMENTS

| | | | |
|---|---|---|---|
| 7,660,133 B1 * | 2/2010 | Hwang et al. | 363/16 |
| 7,706,156 B2 * | 4/2010 | Hsieh et al. | 363/21.02 |
| 7,742,318 B2 * | 6/2010 | Fu et al. | 363/16 |
| 8,456,868 B2 * | 6/2013 | He et al. | 363/20 |
| 8,711,580 B2 * | 4/2014 | Zhang et al. | 363/21.02 |
| 8,717,783 B2 * | 5/2014 | Wang et al. | 363/21.02 |
| 8,988,901 B2 * | 3/2015 | Hara et al. | 363/21.02 |
| 9,030,846 B2 * | 5/2015 | Bai et al. | 363/21.02 |
| 9,077,255 B2 * | 7/2015 | Fu et al. | |
| 9,083,249 B2 * | 7/2015 | Yan et al. | |
| 2009/0153111 A1 | 6/2009 | Mao et al. | |
| 2011/0242854 A1 | 10/2011 | Minami et al. | |
| 2012/0294045 A1 | 11/2012 | Fornage et al. | |
| 2012/0300501 A1 | 11/2012 | Kojima et al. | |
| 2013/0194832 A1 | 8/2013 | Han et al. | |

FOREIGN PATENT DOCUMENTS

| | | |
|---|---|---|
| CN | 101142730 A | 3/2008 |
| CN | 101459383 A | 6/2009 |

(Continued)

OTHER PUBLICATIONS

Weiyi Feng, Student Member, IEEE, and Fred C. Lee, Liefe Fellow, IEEE: "Optimal Trajectory Control of LLC Resonant Converters for Soft Start-Up" IEEE Transactions on Power Electronics, vol. 29, No. 3, Mar. 2014, 8 pages.

*Primary Examiner* — Adolf Berhane
*Assistant Examiner* — Gary Nash
(74) *Attorney, Agent, or Firm* — Futurewei Technologies, Inc.

(57) ABSTRACT

A method comprises providing a resonant converter comprising a switching network comprising a plurality of switches, a resonant tank coupled between the switching network and a transformer, wherein the resonant tank comprises a series resonant inductor coupled to a switching network and the transformer and a series resonant capacitor coupled to the switching network and the transformer and a driver having an adjustable bias voltage and in response to a startup process of the resonant converter, configuring the switching network to operate a switching frequency higher than a resonant frequency of the resonant tank.

19 Claims, 19 Drawing Sheets

(56) References Cited

FOREIGN PATENT DOCUMENTS

| | | | |
|---|---|---|---|
| CN | 102709896 | A | 10/2012 |
| CN | 102801327 | A1 | 11/2012 |
| CN | 103280774 | A | 9/2013 |
| EP | 2709228 | A1 | 3/2014 |

* cited by examiner

STARTUP METHOD AND SYSTEM FOR RESONANT CONVERTERS

TECHNICAL FIELD

The present invention relates to a resonant converter, and, in particular embodiments, to a startup control mechanism for reducing the inrush current of resonant converters.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, inductor-inductor-capacitor (LLC) resonant converters and the like.

As technologies further advance, bus converters have been widely employed in the telecommunication industry. The bus voltages may be divided into three categories, a 12V bus voltage converted from a 48V input dc power supply, a 48V bus voltage converted from a 380V input dc power supply and a 12V bus voltage converted from a 380V input dc power supply. A bus converter not only converts the input voltage from a higher level to a lower level, but also provides isolation through a magnetic device such as transformers and/or the like.

The intermediate bus voltage such as 12V may function as an input power bus for a plurality of downstream non-isolated power converters. The downstream non-isolated power converters may be implemented as step-down dc/dc converters such as buck converters, step-up dc/dc converters such as boost converters, linear regulators, any combinations thereof and/or the like. The downstream non-isolated power converters operate under a tight control loop so that fully regulated output voltages are fed into their respective loads.

As power consumption has become more important, there may be a need for high power density and high efficiency bus converters. LLC resonant converters have become the preferred choice for achieving high performance (e.g., high power density and high efficiency) because LLC resonant converters are capable of reducing switching losses through zero voltage switching and/or zero current switching.

SUMMARY OF THE INVENTION

These and other problems are generally solved or circumvented, and technical advantages are generally achieved, by preferred embodiments of the present invention which reduce the inrush current of an inductor-inductor-capacitor (LLC) resonant power converter during a startup process.

In accordance with an embodiment, a method comprises providing a resonant converter comprising a switching network comprising a plurality of switches, a resonant tank comprising a series resonant inductor coupled to the switching network and a primary side of a transformer and a series resonant capacitor coupled to the switching network and the primary side of the transformer, a synchronous rectifier coupled to a secondary side of the transformer and a driver coupled to the switching network and the synchronous rectifier, wherein the driver is of an adjustable bias voltage.

The method further comprises configuring the switching network to operate a switching frequency higher than a resonant frequency of the resonant tank when the resonant converter is in a startup process and ramping up the adjustable bias voltage during the startup process.

In accordance with another embodiment, a system comprises an input power source, a switching network comprising a first pair of switches coupled between the input power source and a second pair of switches coupled between the input power source, a resonant tank connected between the switching network and a primary side of a transformer, wherein the resonant tank comprises a series resonant inductor coupled to the switching network and the transformer and a series resonant capacitor coupled to the switching network and the transformer, a rectifier coupled to a secondary side of the transformer and a driver coupled to the rectifier and the switching network, wherein the driver is of an adjustable bias voltage and the driver is configured to generate gate drive signals for the switching network and the rectifier, and wherein the gate drive signals are of a switching frequency higher than a resonant frequency of the resonant tank during a startup process.

In accordance with yet another embodiment, a method comprises providing a resonant converter comprising a switching network comprising a plurality of switches, a resonant tank coupled between the switching network and a transformer, wherein the resonant tank comprises a series resonant inductor coupled to a switching network and the transformer and a series resonant capacitor coupled to the switching network and the transformer and a driver having an adjustable bias voltage and in response to a startup process of the resonant converter, configuring the switching network to operate a switching frequency higher than a resonant frequency of the resonant tank.

An advantage of a preferred embodiment of the present invention is reducing the inrush current of a power converter during a startup process.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a startup control mechanism for an inductor-inductor-capacitor (LLC) resonant converter. The invention may also be applied, however, to a variety of resonant converters. Hereinafter, various embodiments will be explained in detail with reference to the accompanying drawings.

Figure 1:
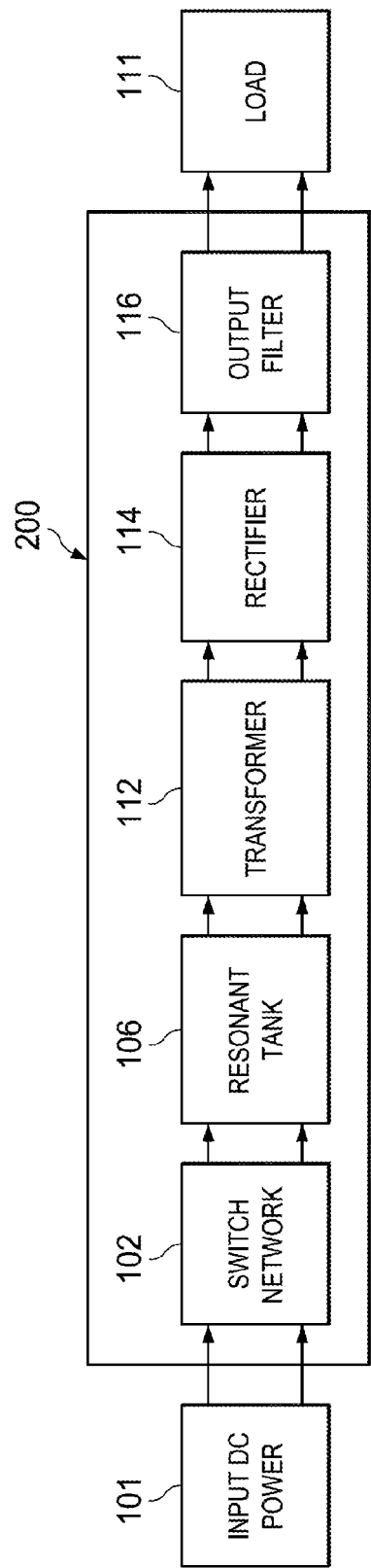
FIG. 1 illustrates a block diagram of an LLC resonant converter in accordance with various embodiments of the present disclosure.

FIG. 1 illustrates a block diagram of an LLC resonant converter in accordance with various embodiments of the present disclosure. The LLC resonant converter 200 is coupled between an input dc power source 101 and a load 111. The input dc power source 101 may be telecommunication power supplies converting a utility line voltage to a dc voltage. Alternatively, the input dc power source 101 may be a solar panel array. Furthermore, the input dc power source 101 may be an energy storage device such as rechargeable batteries, fuel cells and/or the like. The load 111 represents the power consumed by a circuit coupled to the LLC resonant converter 200. Alternatively, the load 111 may refer to downstream converters coupled to the output of the LLC resonant converter 200.

The LLC resonant converter 200 may comprise a switch network 102, a resonant tank 104, a transformer 112, a rectifier 114 and an output filter 116. As shown in FIG. 1, the switch network 102, the resonant tank 104, the transformer 112, the rectifier 114 and the output filter 116 are coupled to each other and connected in cascade between the input dc power source 101 and the load 111.

The switch network 102 may comprise primary side switches of a full bridge resonant converter according to some embodiments. Alternatively, the switch network 102 may be of the primary side switches of other bridge converters such as a half-bridge resonant converter, a push-pull resonant converter and the like. The detailed configuration of the switch network 102 will be described below with respect to FIG. 2.

The resonant tank 104 may be implemented in a variety of ways. For example, the main resonant tank comprises a series resonant inductor, a parallel resonant inductor and a series resonant capacitor (shown in FIG. 2 respectively).

The series resonant inductor and the parallel resonant inductor may be implemented as external inductors. A person skilled in the art will recognize that there may be many variation, alternatives and modifications. For example, the series resonant inductor may be implemented as a leakage inductance of the transformer 112.

In sum, the resonant tank 104 includes three key resonant elements, namely the series resonant inductor, the series resonant capacitor and the parallel resonant inductor. Such a configuration is commonly referred to as an LLC resonant converter. According to the operating principle of LLC resonant converters, at a switching frequency approximately equal to the resonant frequency of the resonant tank 104, the resonant tank 104 helps to achieve zero voltage switching for the primary side switching elements and zero current switching for the secondary side switching elements.

The LLC resonant converter 200 may further comprise a transformer 112, a rectifier 114 and an output filter 116. The transformer 112 provides electrical isolation between the primary side and the secondary side of the LLC resonant converter 200. In accordance with an embodiment, the transformer 112 may be formed of two transformer windings, namely a primary transformer winding and a secondary transformer winding. Alternatively, the transformer 112 may have a center tapped secondary so as to have three transformer windings including a primary transformer winding, a first secondary transformer winding and a second secondary transformer winding.

It should be noted that the transformers described above and throughout the description are merely examples, which should not unduly limit the scope of the claims. One of ordinary skill in the art would recognize many variations, alternatives, and modifications. For example, the transformer 112 may further comprise a variety of bias windings and gate drive auxiliary windings.

The rectifier 114 converts an alternating polarity waveform received from the output of the transformer 112 to a single polarity waveform. When the transformer 112 is of a center tapped secondary, the rectifier 114 may be formed of a pair of switching elements such as n-type metal oxide semiconductor (NMOS) transistors. Alternatively, the rectifier 114 may be formed of a pair of diodes. On the other hand, when the transformer 112 is of a single secondary winding, the rectifier 114 may be a full-wave rectifier coupled to the single secondary winding of the transformer 112.

Furthermore, the rectifier 114 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 114 are well known in the art, and hence are not discussed herein.

The output filter 116 is used to attenuate the switching ripple of the LLC resonant converter 200. According to the operation principles of isolated dc/dc converters, the output filter 116 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 116 are within various embodiments of the present disclosure.

Figure 2:
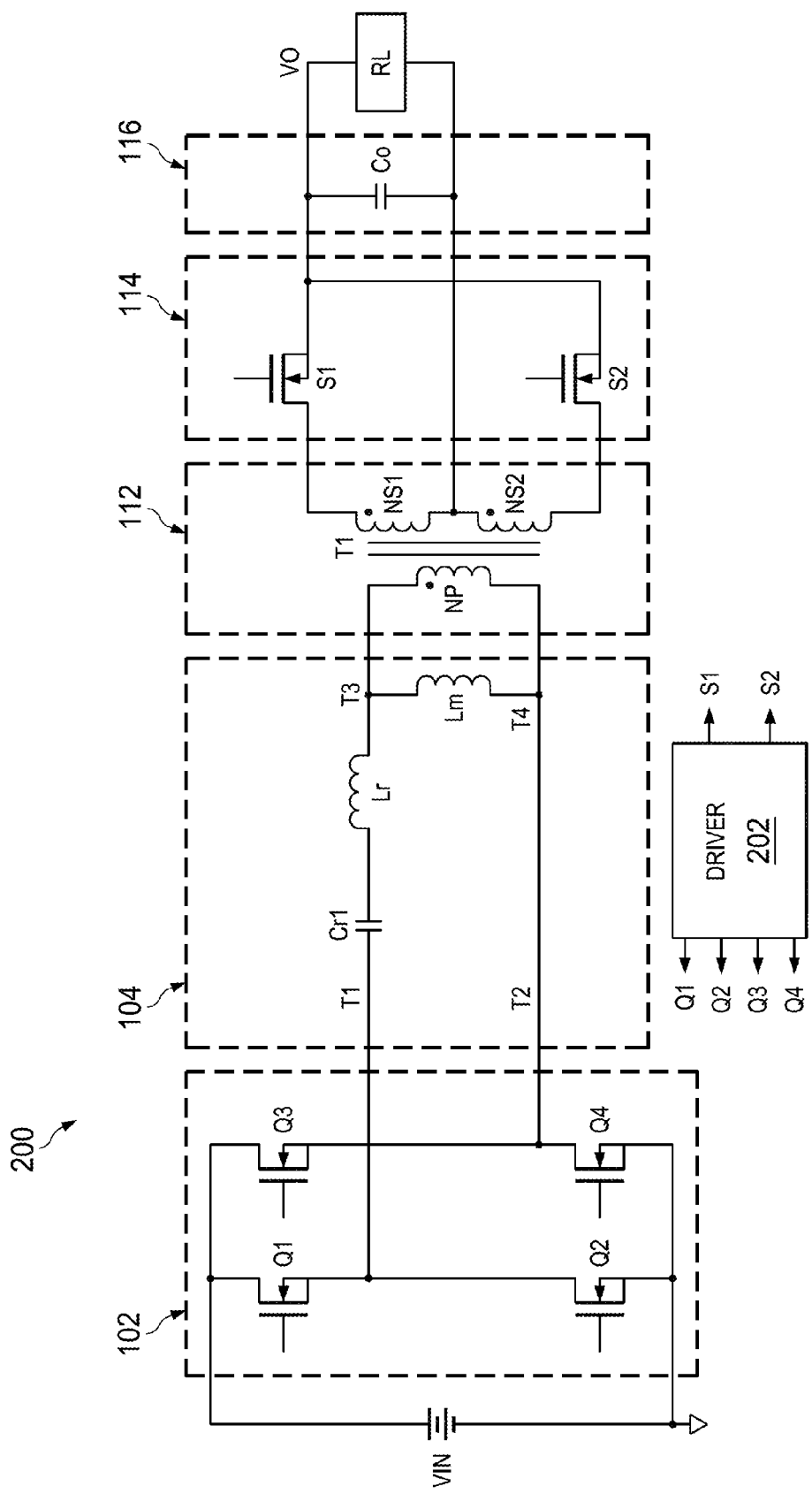
FIG. 2 illustrates a schematic diagram of the LLC resonant converter shown in FIG. 1 in accordance with various embodiments of the present disclosure.

FIG. 2 illustrates a schematic diagram of the LLC resonant converter shown in FIG. 1 in accordance with various embodiments of the present disclosure. The switch network 102 includes four switching elements, namely Q1, Q2, Q3 and Q4. As shown in FIG. 2, a first pair of switching elements Q1 and Q2 are connected in series. A second pair of switching elements Q3 and Q4 are connected in series. The common node of the switching elements Q1 and Q2 is coupled to a first input terminal T1 of the resonant tank 104. Likewise, the common node of the switching elements Q3 and Q4 is coupled to a second input terminal T2 of the resonant tank 104.

The switching elements Q1, Q2, Q3 and Q4 form a primary side switching network of a full bridge resonant converter. According to some embodiments, switching elements Q1, Q2, Q3 and Q4 are implemented as MOSFET or MOSFETs connected in parallel, any combinations thereof and/or the like.

According to alternative embodiments, the primary switches (e.g., switch Q1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full bridge LLC resonant converter (e.g., full bridge LLC resonant converter shown in FIG. 2), the LLC resonant converter 200 shown in FIG. 2 may have many variations, alternatives, and modifications. For example, half bridge converters, push-pull converters may be alternatively employed. The full bridge resonant converter illustrated herein is limited solely for the purpose of clearly illustrating the inventive aspects of the various embodiments. The present invention is not limited to any particular power topology.

It should further be noted that while FIG. 2 illustrates four switches Q1, Q2, Q3, and Q4, various embodiments of the present disclosure may include other variations, modifications and alternatives. For example, a separate capacitor may be connected in parallel with each switch of the primary side switching network. Such a separate capacitor helps to better control the timing of the resonant process of the LLC resonant converter 200.

FIG. 2 further illustrates the resonant tank 104 is coupled between the switch network 102 and the transformer 112. The resonant tank 104 is formed by a series resonant inductor Lr, a series resonant capacitor Cr1 and a parallel inductance Lm. As shown in FIG. 2, the series resonant inductor Lr and the series resonant capacitor Cr1 are connected in series and further coupled to the primary side of the transformer 112.

It should be noted while FIG. 2 shows the series resonant inductor Lr is an independent component, the series resonant inductor Lr may be replaced by the leakage inductance of the transformer 112. In other words, the leakage inductance (not shown) may function as the series resonant inductor Lr.

The transformer 112 may be of a primary winding and a center tapped secondary winding. The primary winding is coupled to terminals T3 and T4 of the resonant tank 104 as shown in FIG. 2. The secondary winding is coupled to the load 111 through the rectifier 114, which is formed by switches S1 and S2. The rectifier formed by switches S1 and S2 may be alternatively referred to as a synchronous rectifier throughout the description.

It should be noted the transformer structure shown in FIG. 2 is merely an example. One person skilled in the art will recognize many alternatives, variations and modification. For example, the secondary side of the transformer 112 may be a single winding. As a result, the secondary side may employ a synchronous rectifier formed by four switching elements (a.k.a. full wave rectifier). The operation principle of a synchronous rectifier coupled to a single secondary winding or a center tapped transformer secondary side is well known, and hence is not discussed in further detail herein.

It should further be noted that the power topology of the LLC resonant converter 200 may be not only applied to the rectifier as shown in FIG. 2, but also applied to other secondary configurations, such as voltage doubler rectifiers, current doubler rectifiers, any combinations thereof and/or the like.

FIG. 2 further illustrates the LLC resonant converter 200 may comprise a driver 202. As shown in FIG. 2, the driver 202 is capable of generating six gate drive signals for the primary switches Q1, Q2, Q3 and Q4, and the secondary switches S1 and S2. Since the driver 202 is able to provide gate drive signals for both the primary side switches and the secondary side switches, the driver 202 may comprise an isolation device such as a signal transformer and/or the like. An illustrative implementation of the driver 202 will be described below with respect to FIG. 3.

One skilled in the art will recognize that a single driver providing drive signals for both the primary side and the secondary side is simply one manner of generating the drive signals and that other and alternate embodiment drivers could be employed (such as employing two separate drivers) and that other circuits, (e.g., lossless gate drive circuits, a pulse width modulation (PWM) gate drive circuits, etc.) could be employed for this function.

Figure 3:
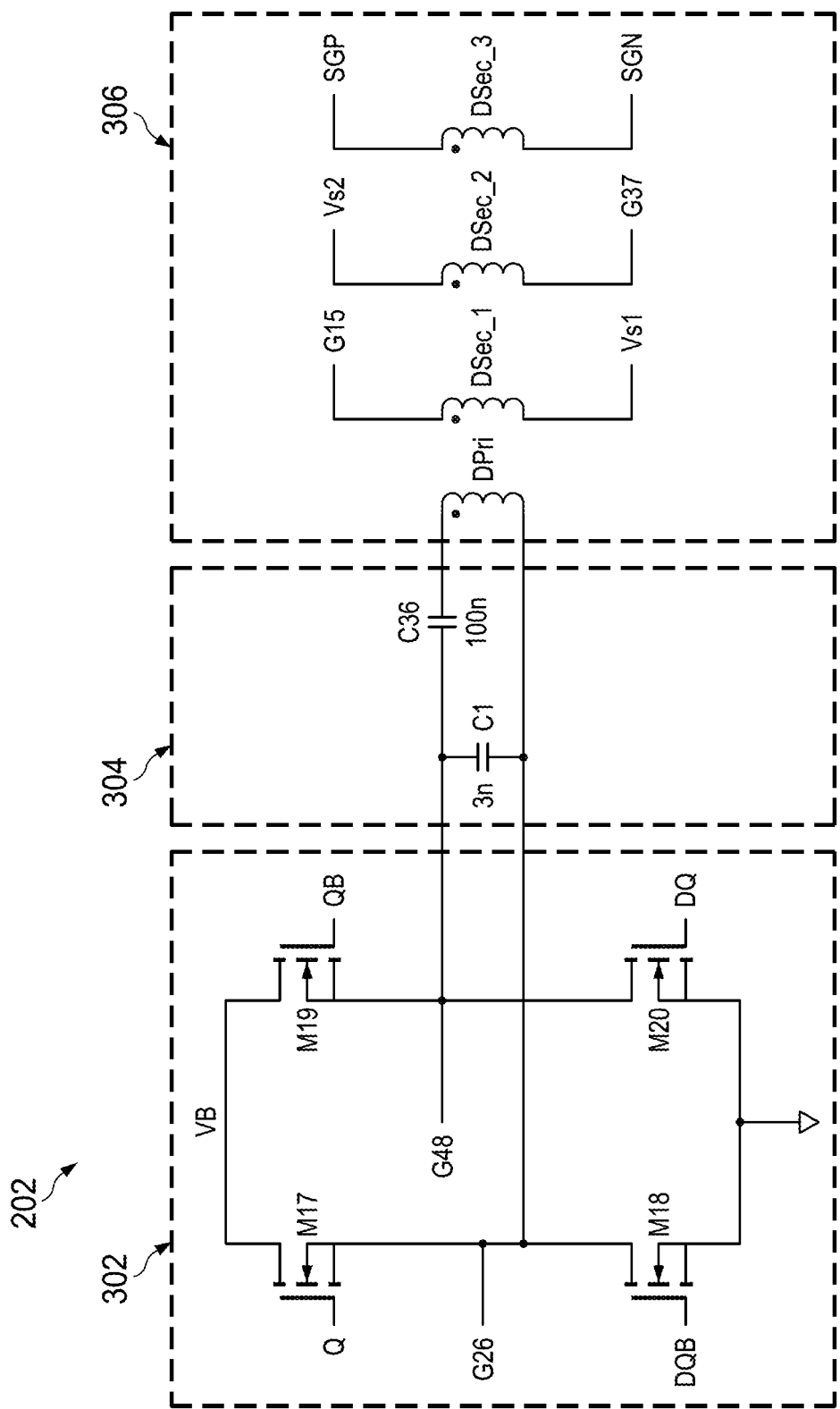
FIG. 3 illustrates a schematic diagram of the driver shown in FIG. 2 in accordance with various embodiments of the present disclosure.

FIG. 3 illustrates a schematic diagram of the driver shown in FIG. 2 in accordance with various embodiments of the present disclosure. In some embodiments, the driver 202 is a lossless gate driver. Throughout the description, the driver 202 is alternatively referred to as the lossless gate driver 202.

The lossless gate driver 202 comprises a full bridge 302, a resonant tank 304 and a signal transformer 306. As shown in FIG. 3, the full bridge 302 is formed by transistors M17, M18, M19 and M20. Transistor M17 and transistor M18 are connected in series between a bias voltage VB and ground. The common node of transistor M17 and transistor M18 is defined as G26 as shown in FIG. 3. In some embodiments, G26 is coupled to a first low side gate drive signal (e.g., the gate drive signal for switch Q2 shown in FIG. 2).

Transistor M19 and transistor M20 are connected in series between the bias voltage VB and ground. The common node of transistor M19 and transistor M20 is defined as G48 as shown in FIG. 3. In some embodiments, G48 is coupled to a second low side gate drive signal (e.g., the gate drive signal for switch Q4 shown in FIG. 2).

According to some embodiments, transistors M17, M18, M19 and M20 are implemented as N-channel MOSFETs, P-channel MOSFETs, any combinations thereof and/or the like. In some embodiments, transistors M17 and M19 are driven by a plurality of narrow PWM pulses. The narrow PWM pulses are of a duty cycle from about 5% to about 25%. Transistors M18 and M20 are driven by a plurality of wide PWM pulses. The wide PWM pulses are of a duty cycle approximately equal to 50%.

The resonant tank 304 may comprise capacitor C1, the magnetizing inductance (not shown) of the signal transformer 306 and the parasitic gate capacitances (not shown) of the main power switches (e.g., Q1 in FIG. 2). In some embodiments, the capacitance of C1 is equal to 3 nF.

In operation, the magnetizing inductance, the capacitor C1 and the parasitic capacitances may form a resonant process in which a resonant inductor current may charge and discharge the gate capacitors of the main power switches (e.g., Q1 in FIG. 2). During the resonant process, the resonant tank helps to return a portion of the energy at the gates of the main power switches to the source such as the bias voltage VB. As such, part of the gate drive energy is recovered so as to achieve lossless gate driving.

It should be noted that the capacitor C36 is not part of the resonant tank 304. The capacitor C36 helps to balance the magnetic flux of the signal transformer 306. In some embodiments, the capacitance of C36 is equal to 100 nF.

The signal transformer 306 comprises a primary winding DPri, a first secondary winding DSec_1, a second secondary winding DSec_2 and a third secondary winding DSec_3. In some embodiments, the output voltage across G15 and Vs1 is used to drive a first high side switch (e.g., switch Q1 shown in FIG. 2). The output voltage across G37 and Vs2 is used to drive a second high side switch (e.g., switch Q3 shown in FIG. 2). Signals SGP and SGN are used to drive the secondary switches S1 and S2 respectively.

The gate drive voltage rating of the low side switches such as Q2 and Q4 is defined as VLS. The gate drive voltage rating of the first high side switch such as Q1 is defined as VHS1. The gate drive voltage rating of the second high side switch such as Q3 is defined as VHS2. The gate drive voltage rating of the secondary side switches such as S1 and S2 is defined as VSS. The turns ratio (Dpri/DSec_1/DSec_2/DSec_3) of the signal transformer 306 is equal to VLS/VHS1/VHS2/VSS*2.

The bias voltage VB is not fixed. The voltage level of VB may vary depending on different operating modes. For example, VB may change during a startup process of the LLC resonant converter 200. Furthermore, VB may vary in response to different load conditions. VB may be of a low voltage level when the LLC resonant converter 200 operates at a light load condition. On the other hand, VB may be of a high voltage level when the LLC resonant converter 200 operates at a full/heavy load condition.

Figure 4:
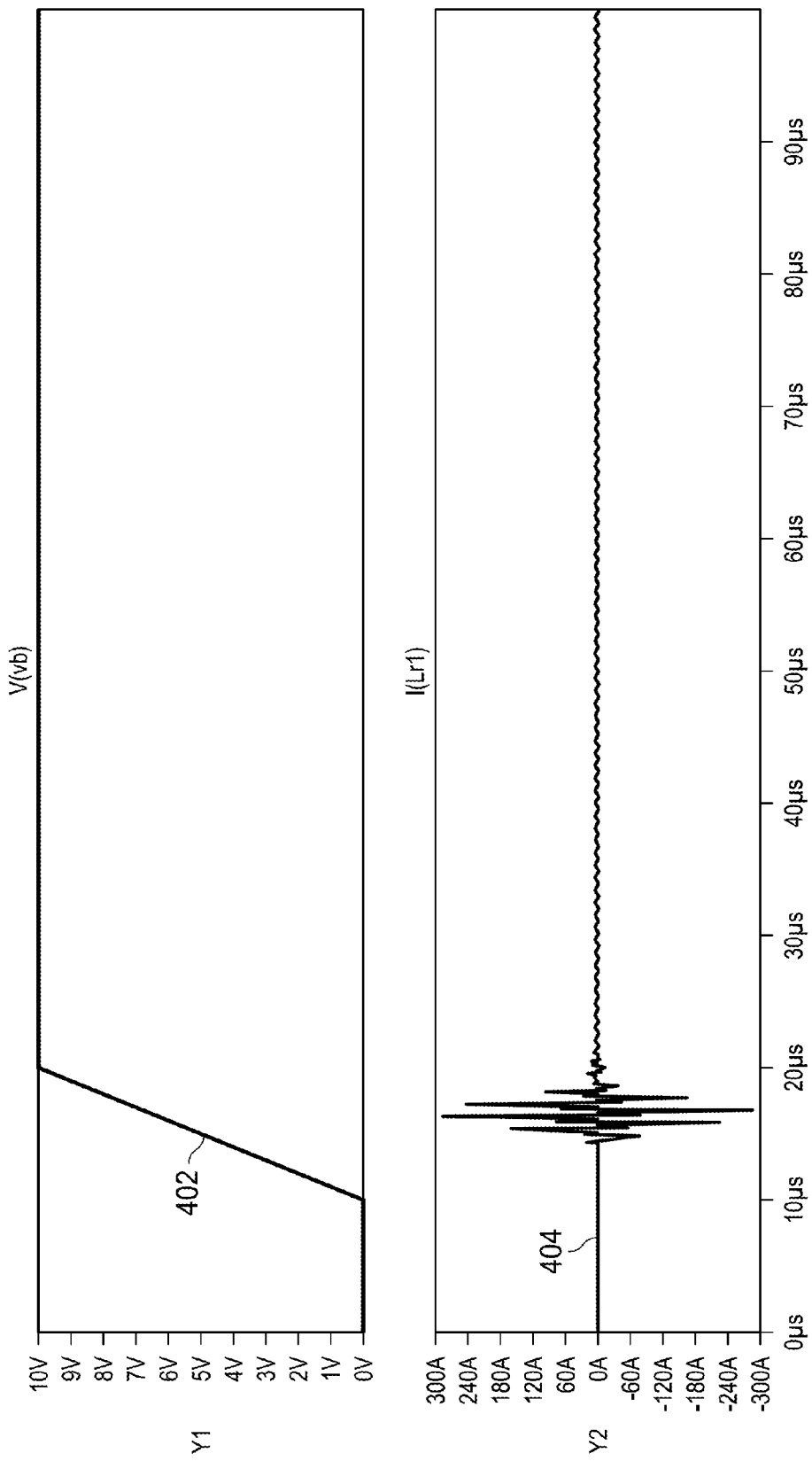
FIG. 4 illustrates key waveforms of the LLC resonant converter in a no-load startup process when the LLC resonant converter operates at a frequency approximately equal to the resonant frequency in accordance with various embodiments of the present disclosure.

FIG. 4 illustrates key waveforms of the LLC resonant converter in a no-load startup process when the LLC resonant converter operates at a frequency approximately equal to the resonant frequency in accordance with various embodiments of the present disclosure. The horizontal axis of FIG. 4 represents intervals of time. The unit of the horizontal axis is micro second. There may be two vertical axes. The first vertical axis Y1 represents the bias voltage supplied to the lossless gate driver 202. The second vertical axis Y2 represents the current flowing through the series resonant inductor Lr.

In some embodiments, during a startup process, the LLC resonant converter 200 operates at a switching frequency approximately equal to the resonant frequency of the resonant tank 104. The waveform 402 illustrates the bias voltage VB during the startup process. As shown in FIG. 4, the bias voltage VB is of a slew rate approximately equal to 1000 mV/us. Alternatively, the slew rate of the bias voltage VB may be less than 1000 mV/us. The waveform 404 shows the current flowing through the series resonant inductor Lr (shown in FIG. 2). As shown in FIG. 4, the peak current flowing through the series resonant inductor Lr is about 283 A during the startup process.

Figure 5:
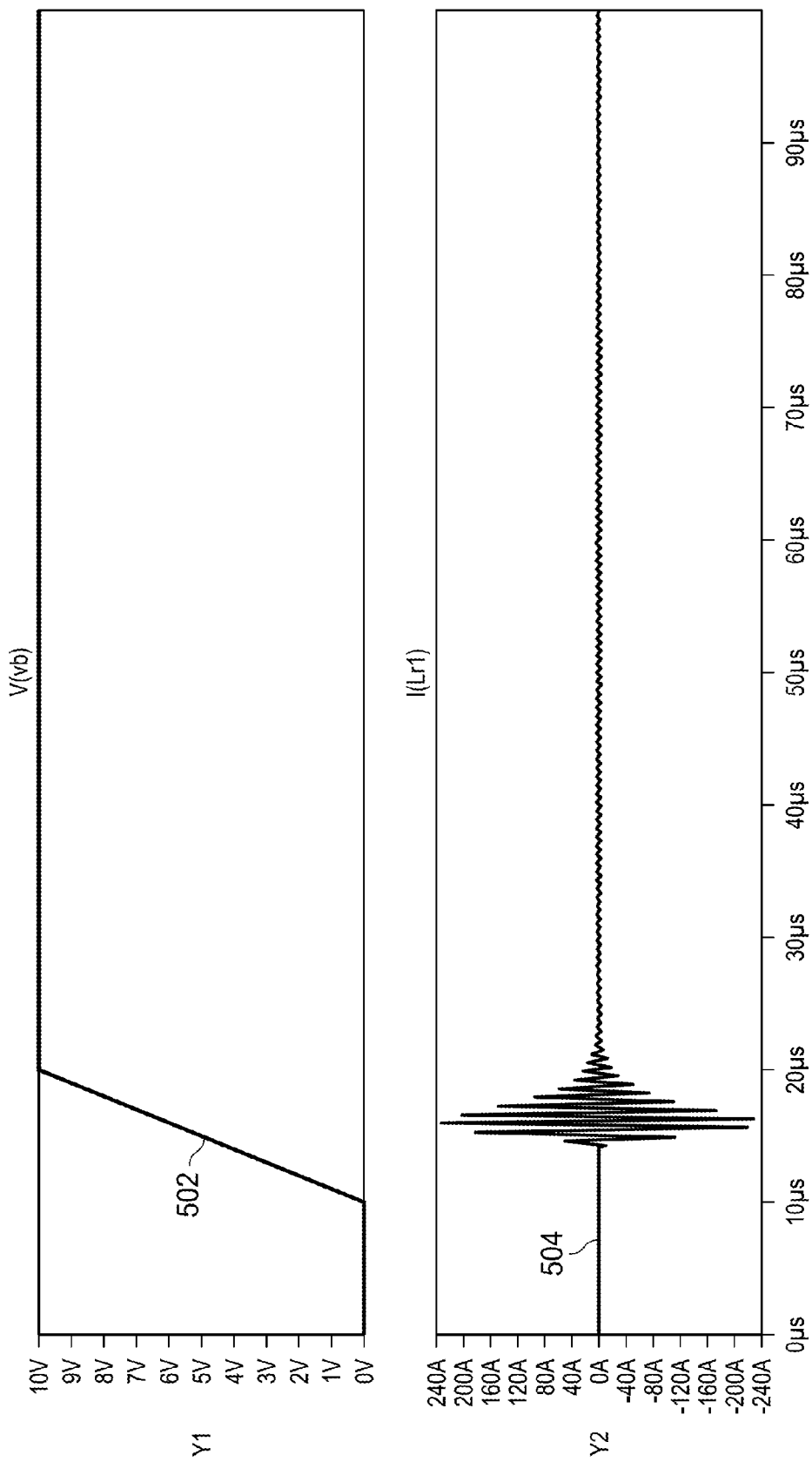
FIG. 5 illustrates key waveforms of the LLC resonant converter in a no-load startup process when the LLC resonant converter operates at a frequency approximately equal to one and a half times the resonant frequency in accordance with various embodiments of the present disclosure.

FIG. 5 illustrates key waveforms of the LLC resonant converter in a no-load startup process when the LLC resonant converter operates at a frequency approximately equal to one and a half times the resonant frequency in accordance with various embodiments of the present disclosure. In some embodiments, during the startup process, the LLC resonant converter 200 operates at a switching frequency approximately equal to one and a half times the resonant frequency of the resonant tank 104. The waveform 502 illustrates the bias voltage VB during the startup process. As shown in FIG. 5, the bias voltage VB is of a slew rate approximately equal to 1000 mV/us. The waveform 504 shows the current flowing through the series resonant inductor Lr. As shown in FIG. 5, the peak current flowing through the series resonant inductor Lr is about 226 A during the startup process.

In comparison with the peak current shown in FIG. 4, the peak current shown in FIG. 5 is about 20% less than that shown in FIG. 4. Because the results shown in FIG. 4 and FIG. 5 are obtained under the same operating conditions except the switching frequency, the reduced peak current shown in FIG. 5 illustrates a higher switching frequency helps to reduce the peak current (a.k.a. the inrush current) during a startup process of the LLC resonant converter 200.

It should be noted that the switching frequency shown in FIG. 5 is merely an example. One of ordinary skill in the art would recognize many variations, alternatives, and modifications. For example, the switching frequency may be less than three times the resonant frequency. Alternatively, the switching frequency may be less than two times the resonant frequency.

Figure 6:
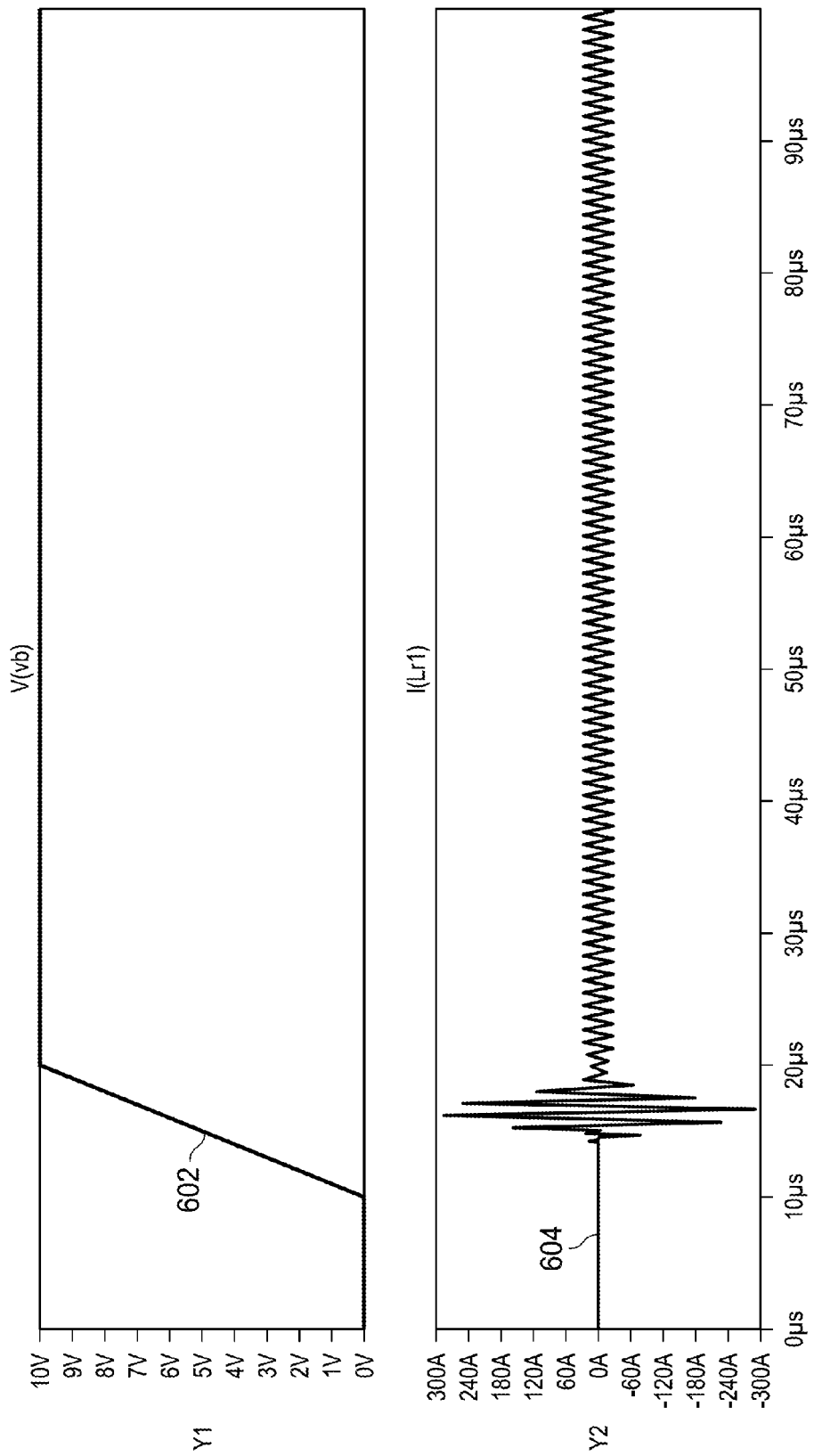
FIG. 6 illustrates key waveforms of the LLC resonant converter in a full-load startup process when the LLC resonant converter operates at a frequency approximately equal to the resonant frequency in accordance with various embodiments of the present disclosure.

FIG. 6 illustrates key waveforms of the LLC resonant converter in a full-load startup process when the LLC resonant converter operates at a frequency approximately equal to the resonant frequency in accordance with various embodiments of the present disclosure. The waveform 602 illustrates the bias voltage VB during the startup process. As shown in FIG. 6, the bias voltage VB is of a slew rate approximately equal to 1000 mV/us. The waveform 604 shows the current flowing through the series resonant inductor Lr. As shown in FIG. 6, the peak current flowing through the series resonant inductor Lr is about 286 A during the startup process.

Figure 7:
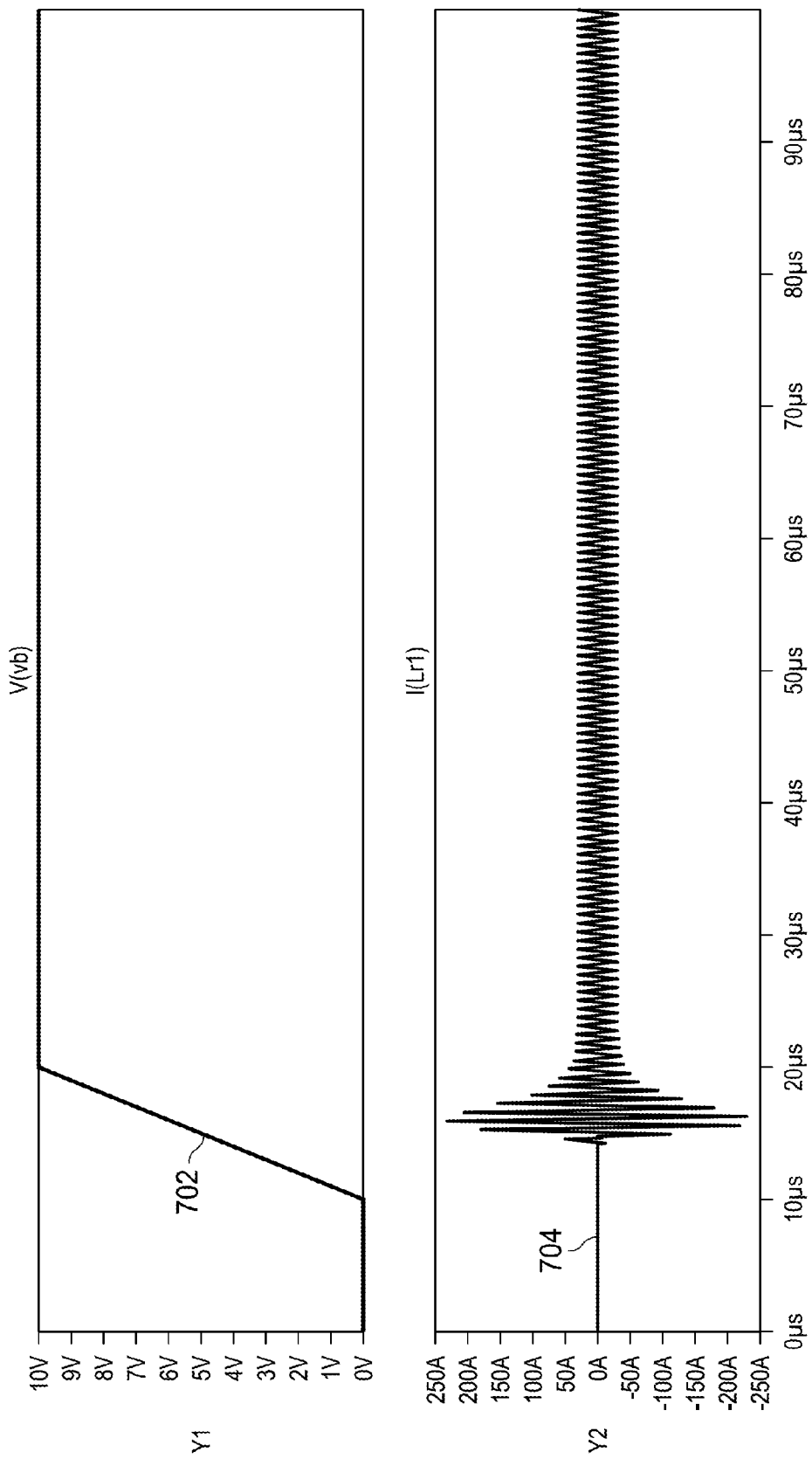
FIG. 7 illustrates key waveforms of the LLC resonant converter in a full-load startup process when the LLC resonant converter operates at a frequency approximately equal to one and a half times the resonant frequency in accordance with various embodiments of the present disclosure.

FIG. 7 illustrates key waveforms of the LLC resonant converter in a full-load startup process when the LLC resonant converter operates at a frequency approximately equal to one and a half times the resonant frequency in accordance with various embodiments of the present disclosure. The waveform 702 illustrates the bias voltage VB during the startup process. As shown in FIG. 7, the bias voltage VB is of a slew rate approximately equal to 1000 mV/us. The waveform 704 shows the current flowing through the series resonant inductor Lr. As shown in FIG. 7, the peak current flowing through the series resonant inductor Lr is about 228 A during the startup process.

In sum, the comparison results at different load levels show a higher switching frequency helps to reduce the peak current flowing through the LLC resonant converter 200 during a startup process. The switching frequency shown in FIG. 5 and FIG. 7 is merely an example, which should not unduly limit the scope of the claims. One of ordinary skill in the art would recognize many variations, alternatives, and modifications. For example, the LLC resonant converter 200 may operates at other switching frequencies such as two or three times the resonant frequency.

It should be noted that, in order to achieve zero voltage switching and/or zero current switching, after the startup process finishes, the LLC resonant converter 200 may operate at a switching frequency approximately equal to the resonant frequency.

FIGS. 8-11 illustrates key waveforms of the LLC resonant converter when the bias voltage VB is of a slew rate less than that shown in FIGS. 4-7. Waveforms 802, 902, 1002 and 1102 show the slew rate of VB is about 26 mV/us.

Figure 8:
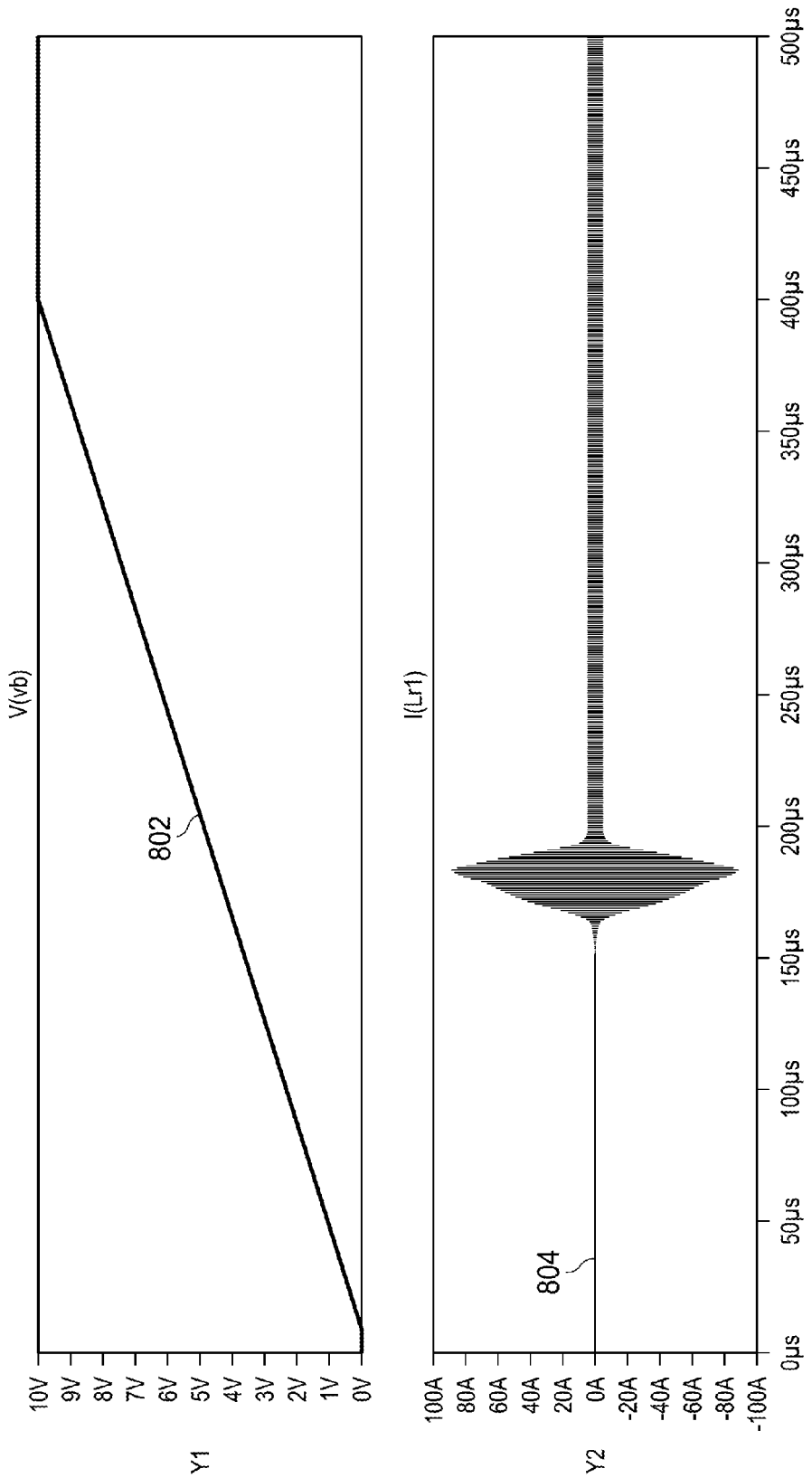
FIGS. 8-11 illustrates key waveforms of the LLC resonant converter when the bias voltage VB is of a slew rate less than that shown in FIGS. 4-7.
Figure 9:
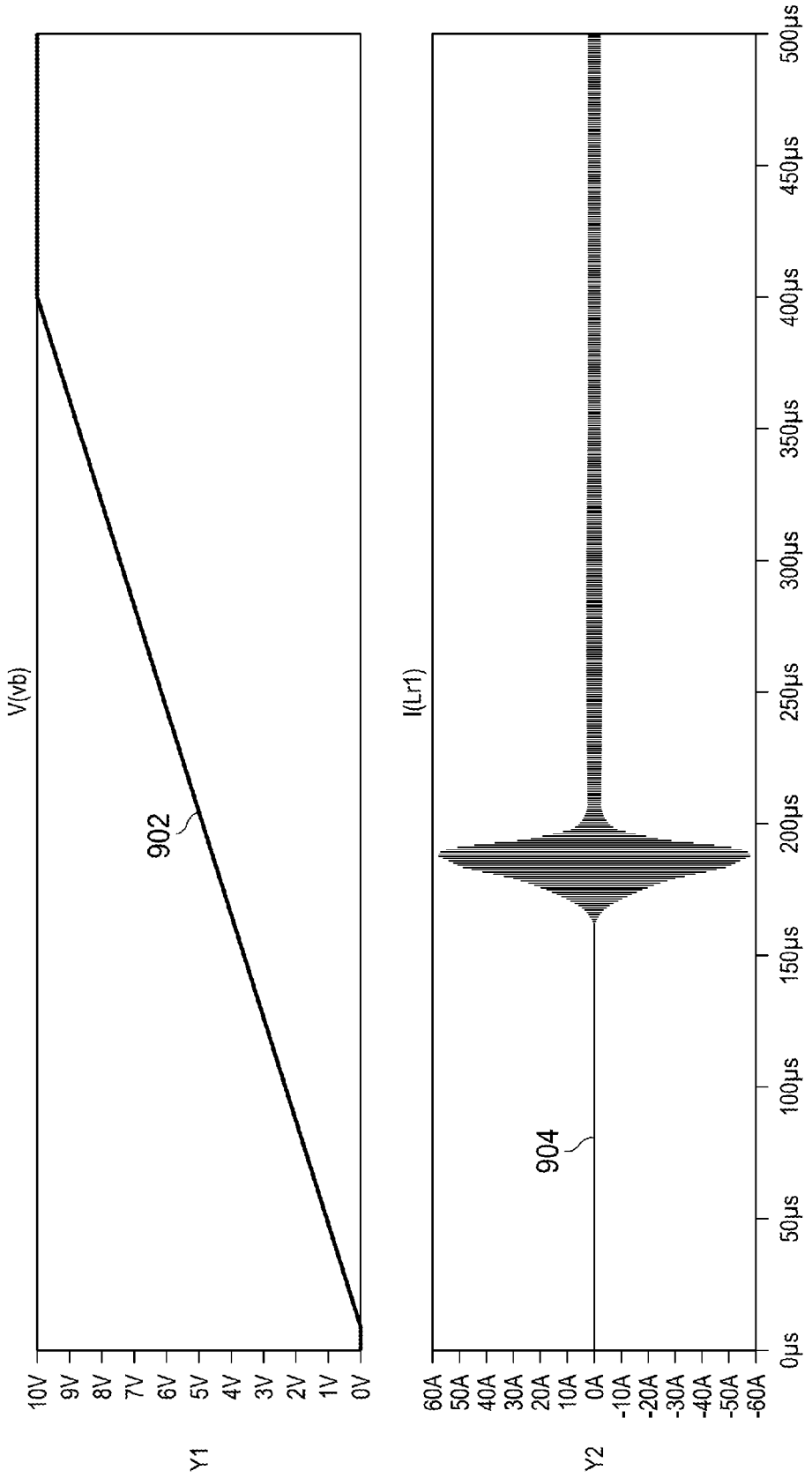

In FIG. 8, at a no-load startup process, the waveform 804 shows the peak current is about 87 A when the LLC resonant converter 200 operates at a switching frequency approximately equal to the resonant frequency. In FIG. 9, at a no-load startup process, the waveform 904 shows the peak current is about 57 A when the LLC resonant converter 200 operates at a switching frequency approximately equal to one and a half times the resonant frequency.

Figure 10:
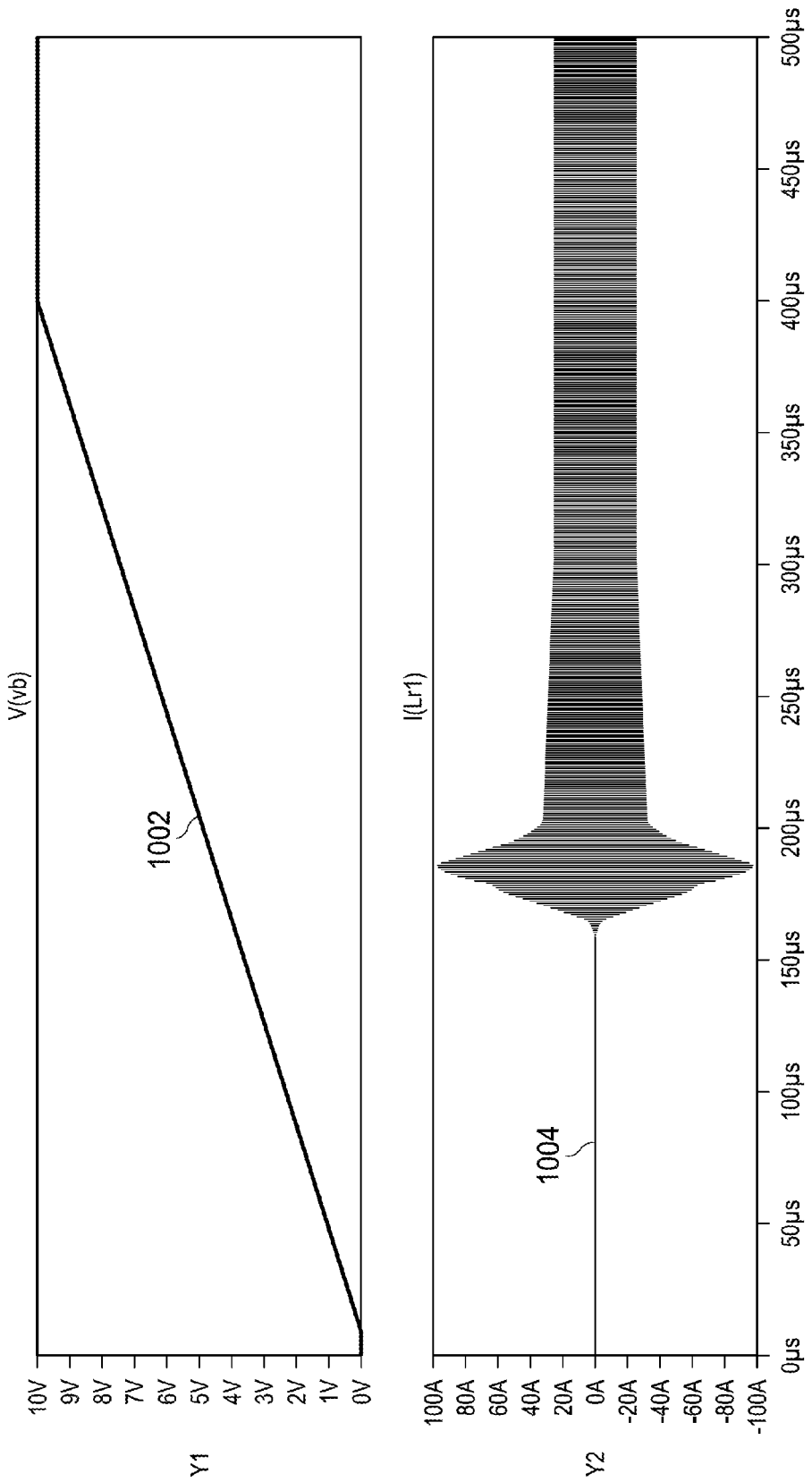
Figure 11:
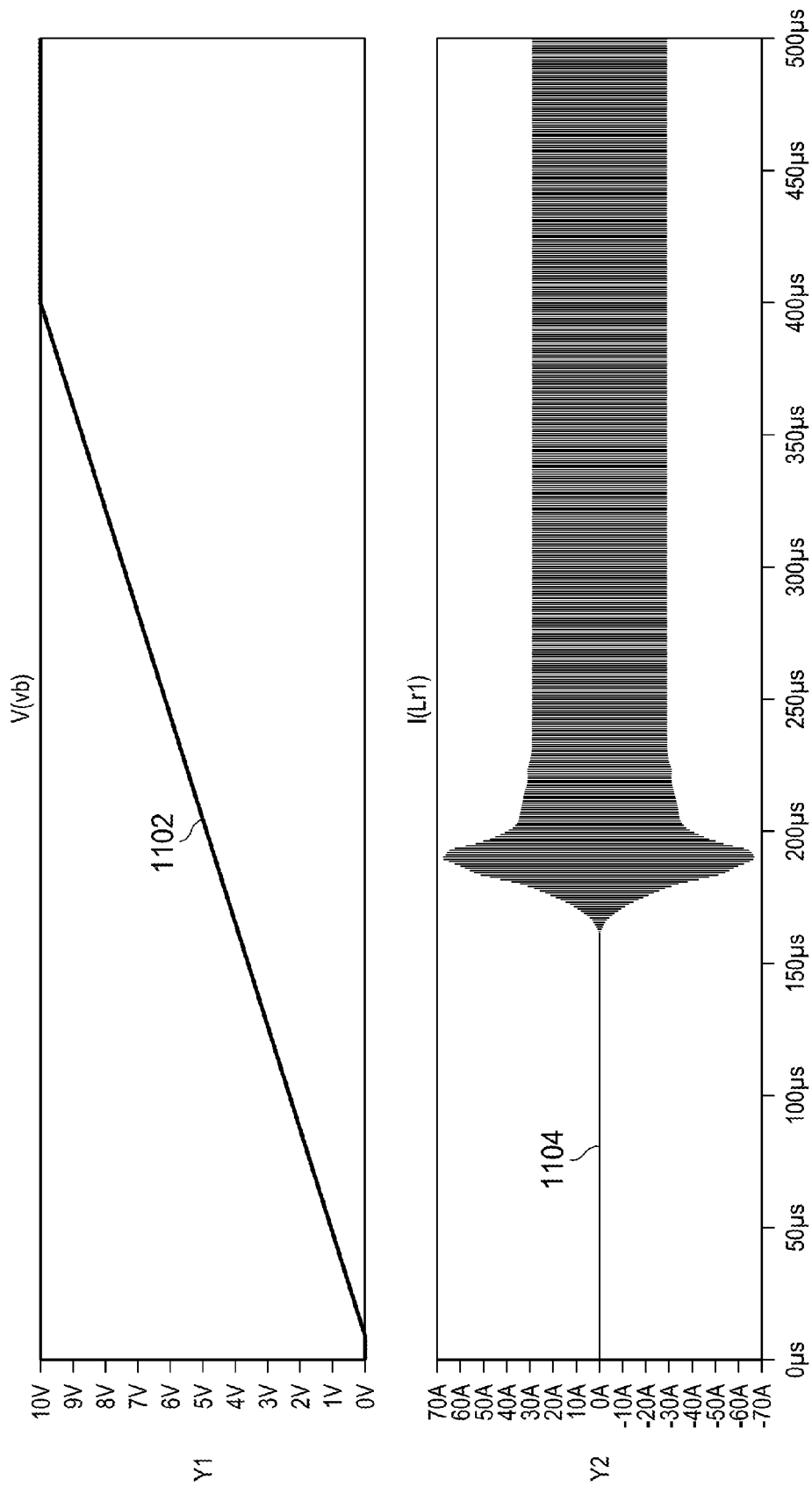

In FIG. 10, at a full-load startup process, the waveform 1004 shows the peak current is about 96 A when the LLC resonant converter 200 operates at a switching frequency approximately equal to the resonant frequency. In FIG. 11, at a full-load startup process, the waveform 1104 shows the peak current is about 65 A when the LLC resonant converter 200 operates at a switching frequency approximately equal to one and a half times the resonant frequency.

In sum, the comparison results at different load levels show a slow ramp-up of the bias voltage VB helps to further reduce the peak current flowing through the LLC resonant converter 200. The slew rate shown in FIGS. 8-11 is merely an example, which should not unduly limit the scope of the claims. One of ordinary skill in the art would recognize many variations, alternatives, and modifications.

It should be noted that the higher switching frequency control mechanism shown in FIGS. 4-7 and the slew rate control mechanism shown in FIGS. 8-11 can be combined with a duty cycle control mechanism when the driver 202 shown in FIG. 3 is a PWM driver. More particularly, the duty cycle of the driver 202 may be reduced so as to limit the inrush current flowing through the series resonant inductor.

FIGS. 12-15 illustrates key waveforms of the LLC resonant converter when the ramp up process the bias voltage VB includes a plurality of stages. Waveforms 1202, 1302, 1402 and 1502 show the ramp-up process of the bias voltage VB includes a first stage 1201, a second stage 1203 and a third stage 1205. In the first stage 1201, the bias voltage VB increases from about 0 V to about the turn-on threshold of the main power switches (e.g., switch Q1 shown in FIG. 2). The slew rate of the bias voltage VB in the first stage 1201 is approximately equal to 1000 mV/us.

Figure 12:
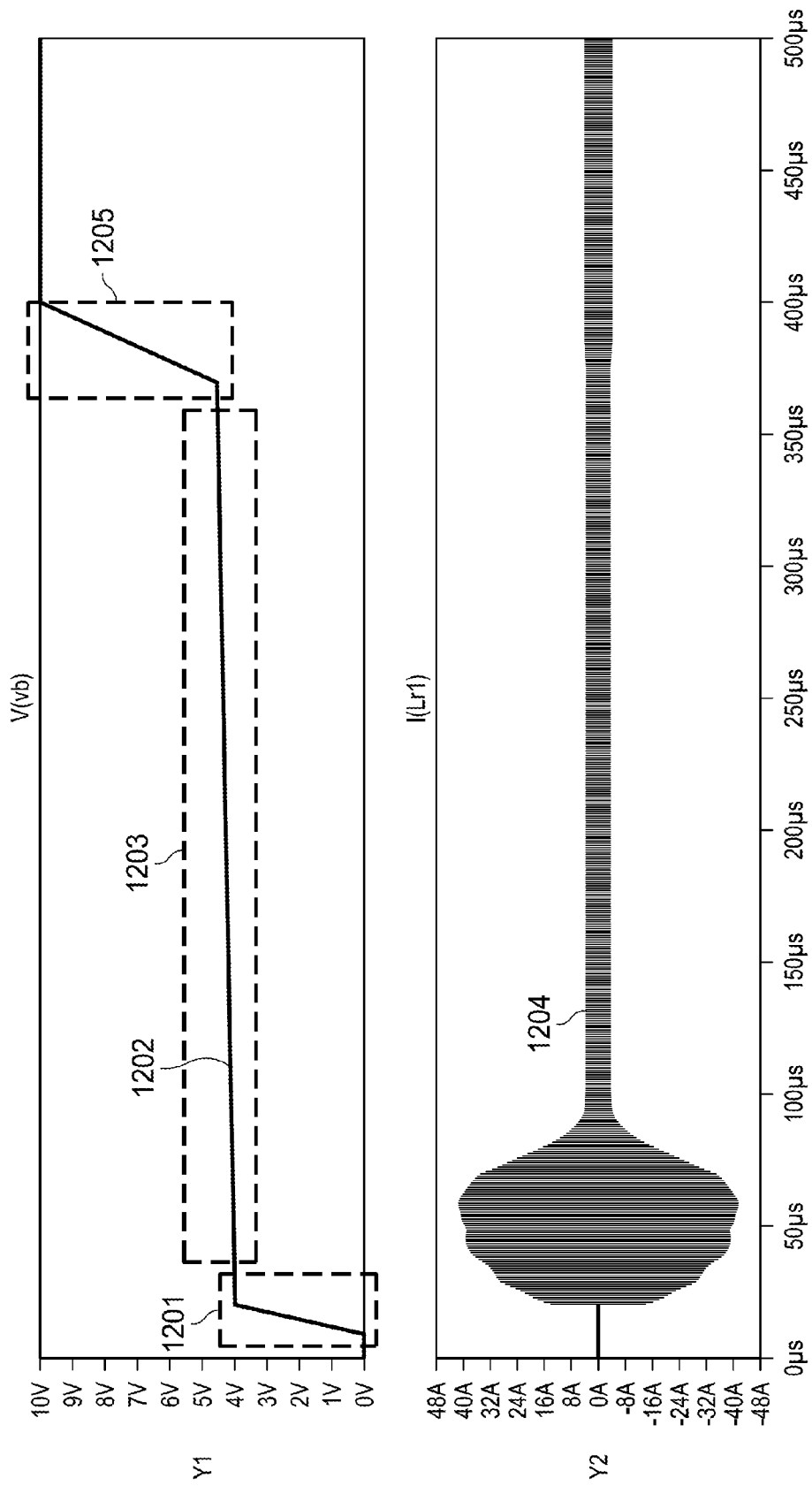
FIGS. 12-15 illustrates key waveforms of the LLC resonant converter when the ramp up process the bias voltage VB includes a plurality of stages.

In the second stage 1203, the bias voltage VB slowly increases from the turn-on threshold to the Miller-plateau voltage of the power switches. In some embodiments, the period of the second stage 1203 is about 350 us as shown in FIG. 12. However, as one having ordinary skill in the art will recognize, the period shown in FIG. 12 is merely an example and is not meant to limit the current embodiments. The bias voltage VB may stay at the second stage even longer as long as the thermal stress limitation of the LLC resonant converter 200 is not exceeded.

In the third stage 1205, the bias voltage VB increases from the Miller-plateau voltage to the steady gate drive voltage. In some embodiments, the slew rate of the bias voltage VB in the third stage 1205 is approximately equal to 1000 mV/us.

Figure 13:
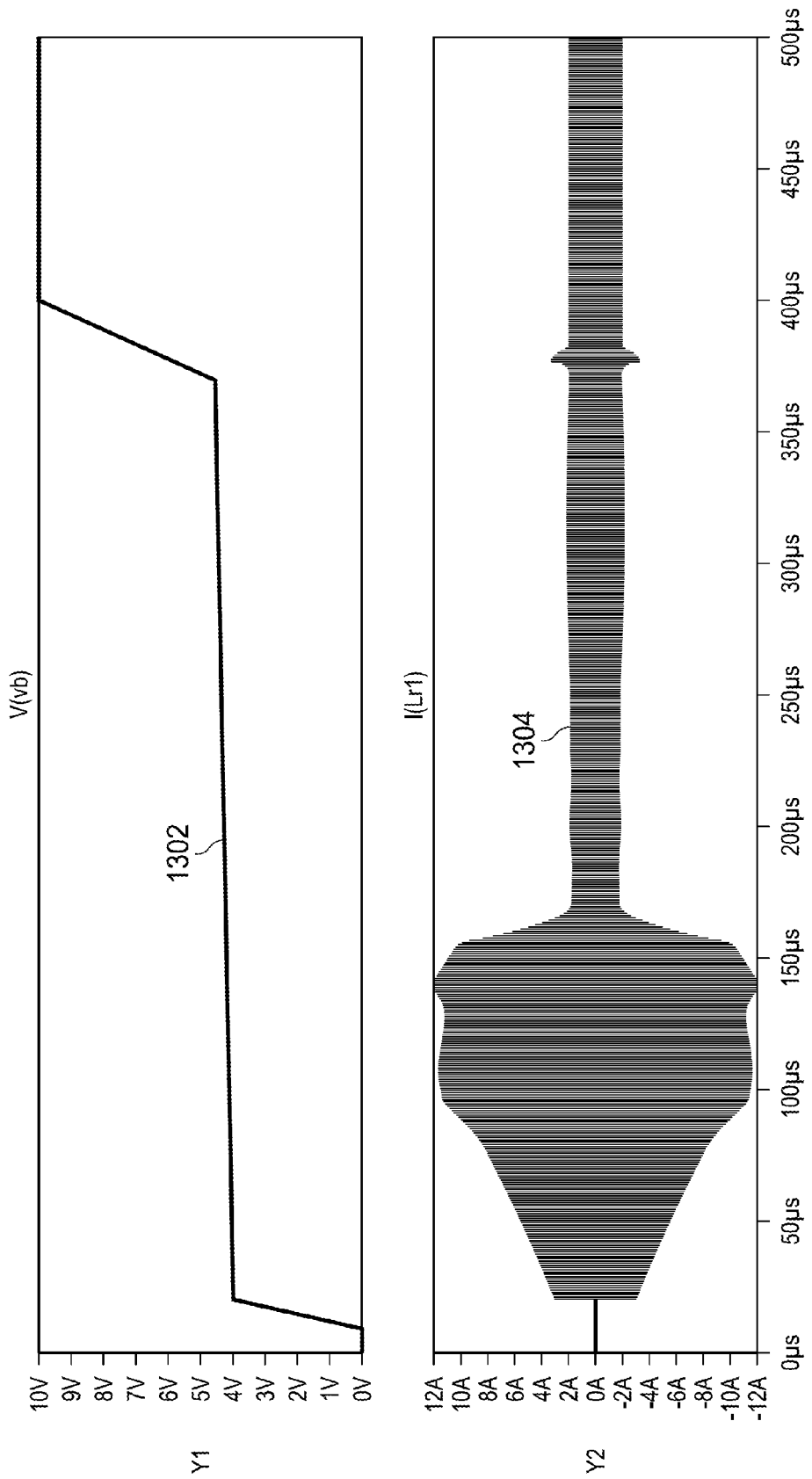

In FIG. 12, at a no-load startup process, the waveform 1204 shows the peak current is about 41 A when the LLC resonant converter 200 operates at a switching frequency approximately equal to the resonant frequency. In FIG. 13, at a no-load startup process, the waveform 1304 shows the peak current is about 12 A when the LLC resonant converter 200 operates at a switching frequency approximately equal to one and a half times the resonant frequency.

Figure 14:
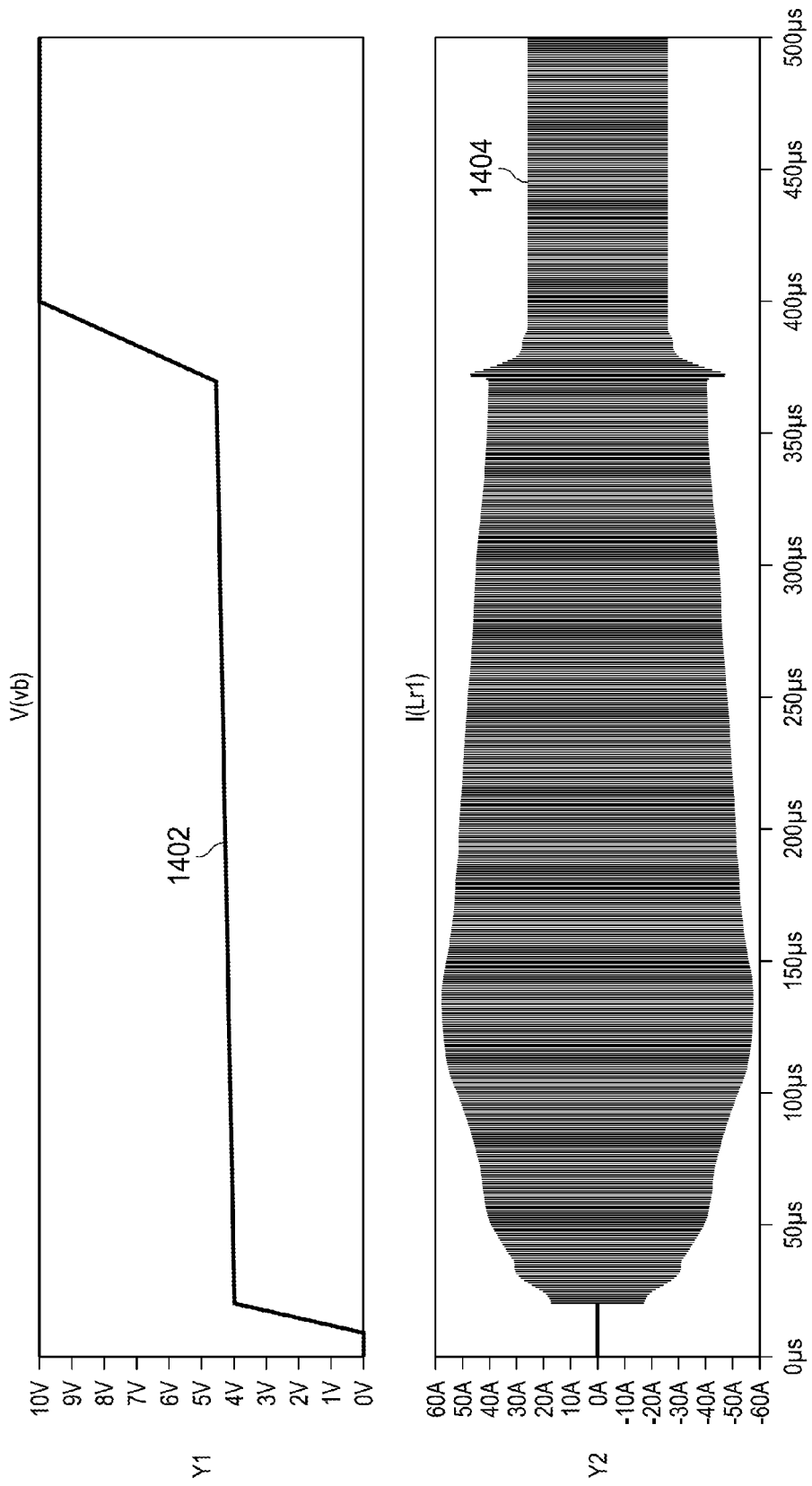
Figure 15:
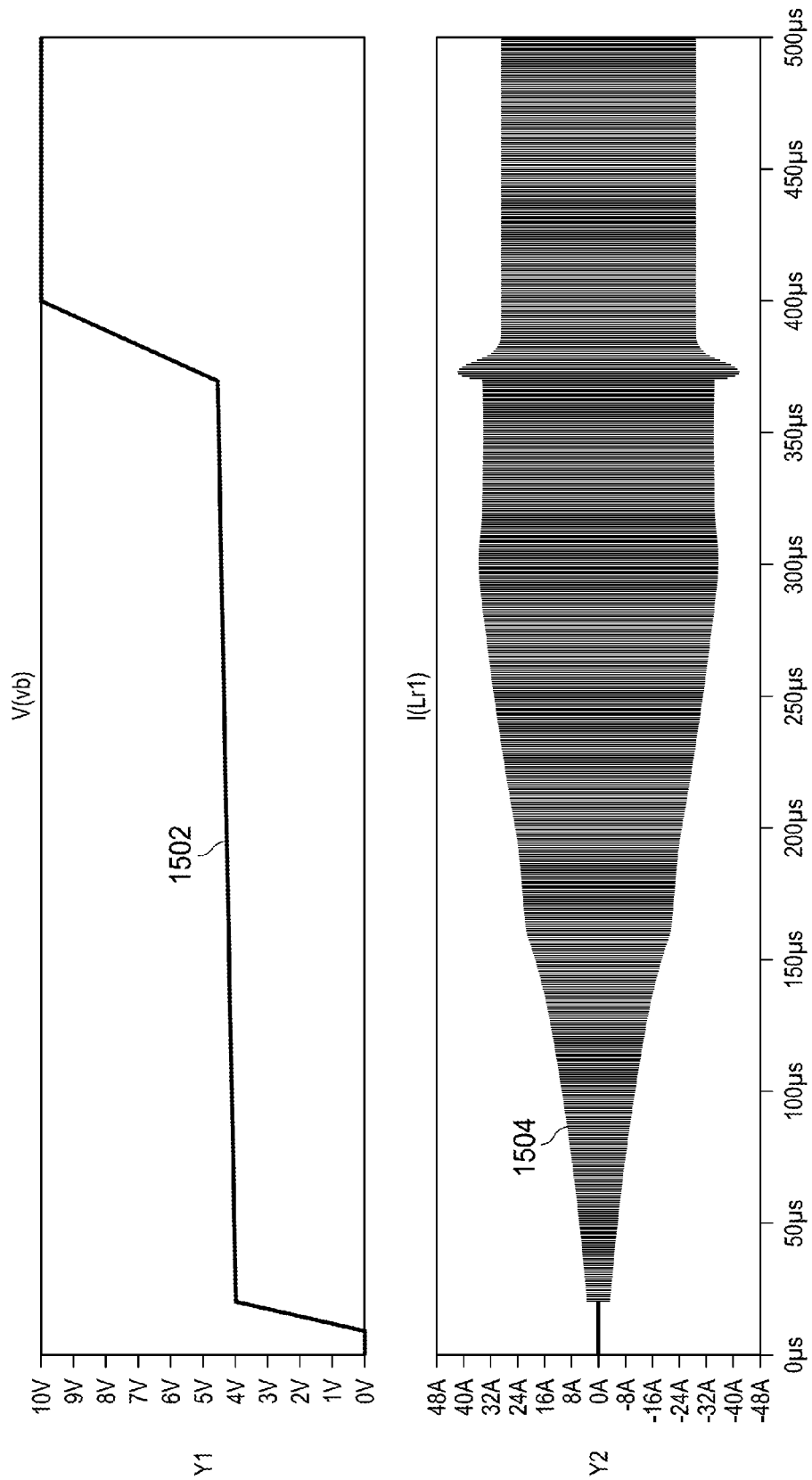

In FIG. 14, at a full-load startup process, the waveform 1404 shows the peak current is about 57 A when the LLC resonant converter 200 operates at a switching frequency approximately equal to the resonant frequency. In FIG. 15, at a full-load startup process, the waveform 1504 shows the peak current is about 40 A when the LLC resonant converter 200 operates at a switching frequency approximately equal to one and a half times the resonant frequency.

In sum, the comparison results at different load levels show a multi-step VB ramp-up process helps to further reduce the peak current flowing through the LLC resonant converter 200. The ramp-up process shown in FIGS. 12-15 is merely an example, which should not unduly limit the scope of the claims. One of ordinary skill in the art would recognize many variations, alternatives, and modifications. For example, the VB ramp up process may comprise more than three stages.

FIGS. 16-19 illustrates key waveforms of the LLC resonant converter when the ramp up process the bias voltage VB includes a non-linear ramp up stage. Waveforms 1602, 1702, 1802 and 1902 show the ramp up process of the bias voltage VB includes a first stage 1601, a second stage 1603 and a third stage 1605. The first stage 1601 and the second stage 1603 are similar to the first stage 1201 and the second stage 1203 (shown in FIG. 12) respectively, and hence are not discussed in further detail herein. The third stage 1605 is a non-linear stage. Depending on different applications and design needs, the ramp up process of the third stage 1605 may be expressed by an exponential function. In comparison with the third stage 1205 shown in FIG. 12, the non-linear stage 1605 helps to reduce the thermal stress of the LLC resonant converter 200 during the startup process.

Figure 16:
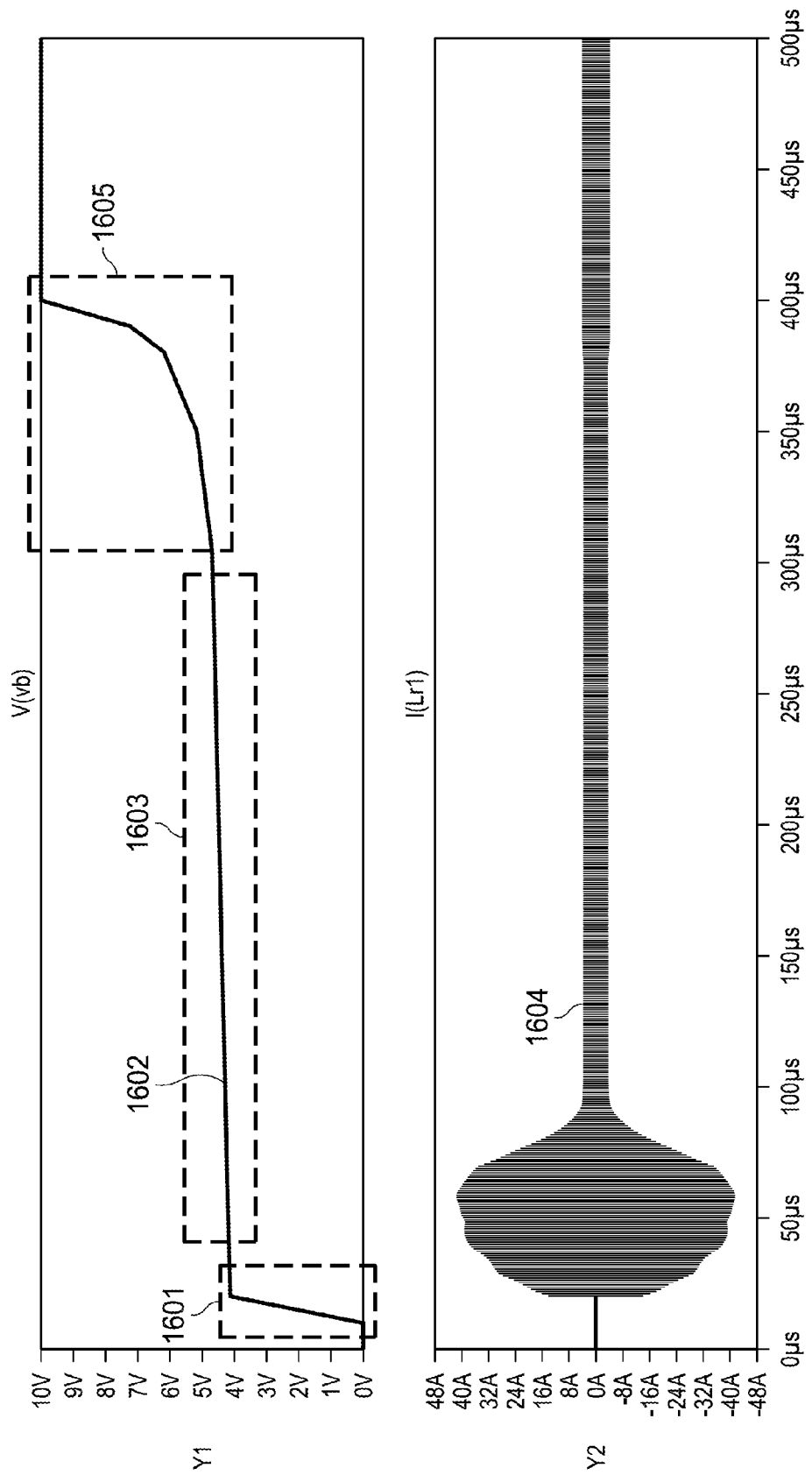
FIGS. 16-19 illustrates key waveforms of the LLC resonant converter when the ramp up process the bias voltage VB includes a non-linear ramp up stage.
Figure 17:
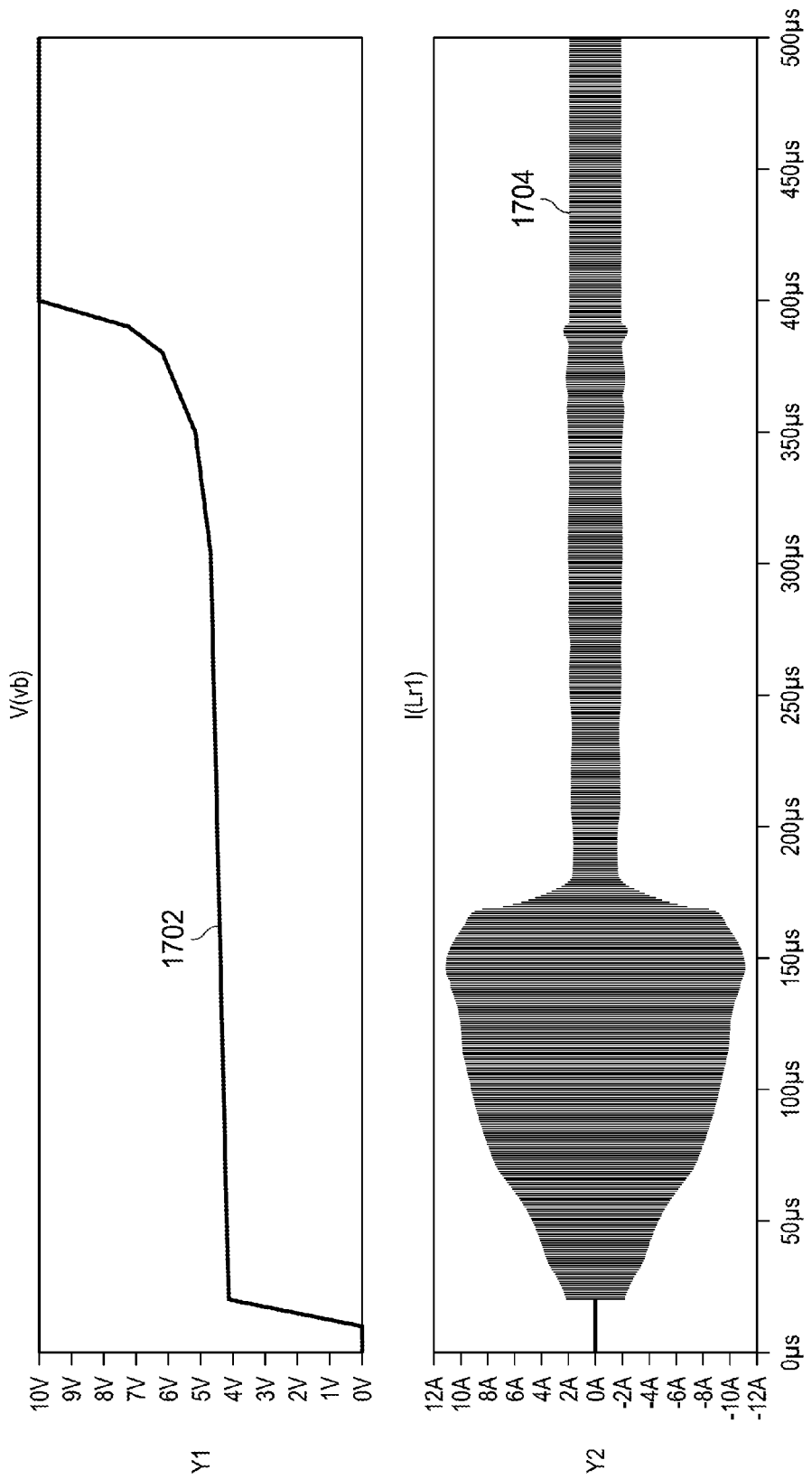

In FIG. 16, at a no-load startup process, the waveform 1604 shows the peak current is about 41 A when the LLC resonant converter 200 operates at a switching frequency approximately equal to the resonant frequency. In FIG. 17, at a no-load startup process, the waveform 1704 shows the peak current is about 11 A when the LLC resonant converter 200 operates at a switching frequency approximately equal to one and a half times the resonant frequency.

Figure 18:
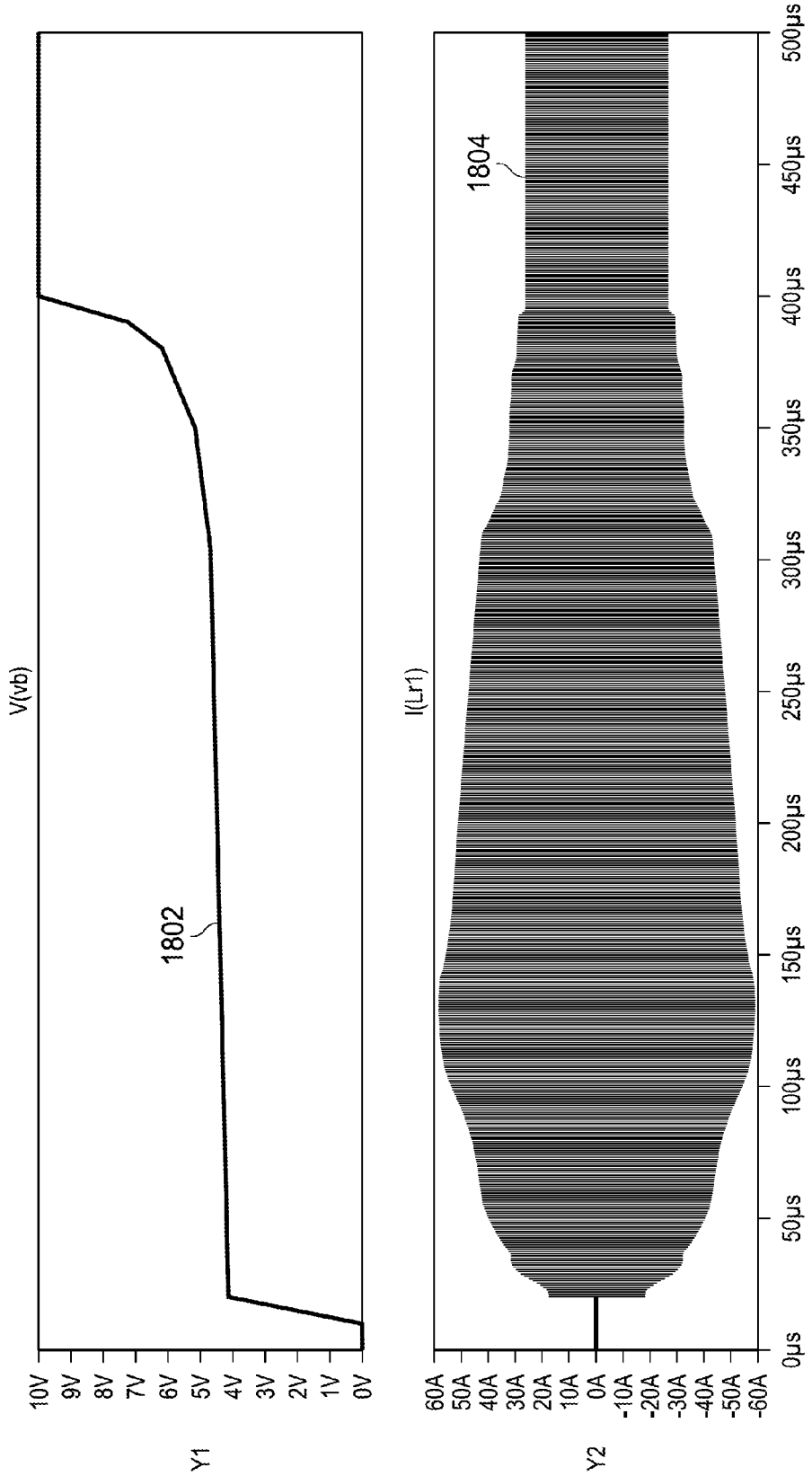
Figure 19:
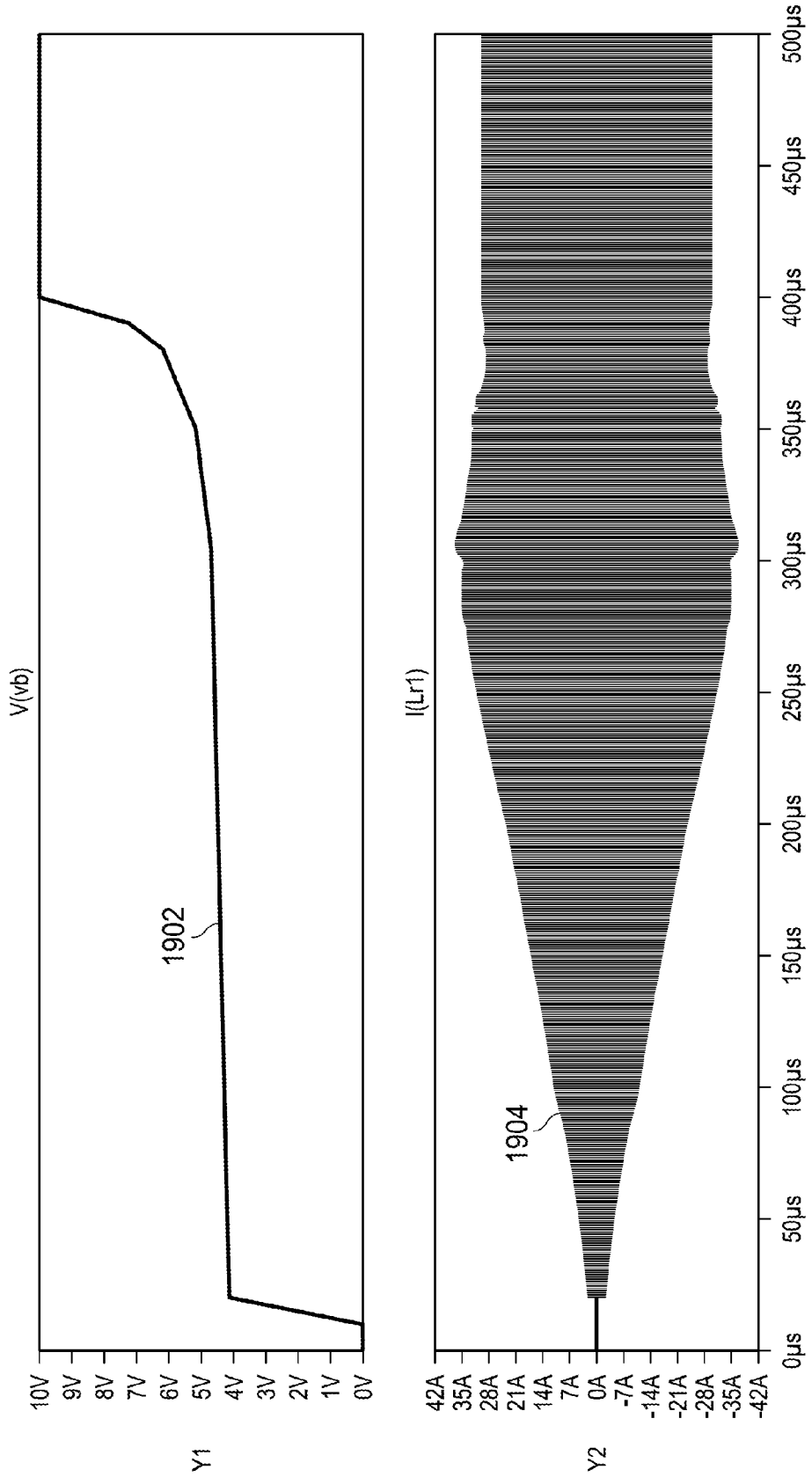

In FIG. 18, at a full-load startup process, the waveform 1804 shows the peak current is about 57 A when the LLC resonant converter 200 operates at a switching frequency approximately equal to the resonant frequency. In FIG. 19, at a full-load startup process, the waveform 1904 shows the peak current is about 36 A when the LLC resonant converter 200 operates at a switching frequency approximately equal to one and a half times the resonant frequency.

In sum, the comparison results at different load levels show a non-linear ramp-up stage helps to further reduce the peak current flowing through the LLC resonant converter 200. The ramp-up process shown in FIGS. 16-19 is merely an example, which should not unduly limit the scope of the claims. One of ordinary skill in the art would recognize many variations, alternatives, and modifications. For example, the exponential function can be replaced by other suitable non-linear functions.

The multiple ramp-up steps shown in FIGS. 12-19 include a slow ramp-up stage. As shown in FIG. 12 and FIG. 16, the slow ramp-up stage (e.g., stage 1203 in FIG. 12 and stage 1603 in FIG. 16) is a slope. The slope may be implemented as a plurality of small steps, which are used to emulate the slopes shown in FIG. 12 and FIG. 16. The small steps can be generated by suitable processors such as a digital signal processing (DSP) processor and/or the like. Furthermore, the non-linear voltage ramp-up stage 1605 shown in FIG. 16 may be implemented as a plurality of small steps.

FIGS. 12 and 16 show the first stage 1201, the first stage 1601 and the third stage 1205 are a slope. The third stage 1605 is a non-linear curve. A skilled person in the art will appreciate that there can be many variations of the shape of the ramp-up stages. For example, the stages 1201, 1205, 1601 and 1605 may further comprise a plurality of sub-segments. Each sub-segment may be a linear curve, a non-linear curve, any combinations thereof and/or the like.

It should be noted that the average voltage of the slow ramp-up stage (e.g., stage 1203 in FIG. 12 and stage 1603 in FIG. 16) is in a range from the turn-on threshold voltage of the switches and the Miller-plateau voltage of the switches (e.g., switch Q1 of FIG. 2). A controller (not shown) may be employed to determine the average voltage based upon detecting and analyzing a variety of operating variables of the LLC resonant converter 200. The variables include the input voltage, the input current, the output voltage, the output current, the switching frequency, any combinations thereof and/or the like.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
  providing a resonant converter comprising:
    a switching network comprising a plurality of switches;
    a resonant tank comprising:
      a series resonant inductor coupled to the switching network and a primary side of a transformer; and
      a series resonant capacitor coupled to the switching network and the primary side of the transformer;
    a synchronous rectifier coupled to a secondary side of the transformer; and
    a driver coupled to the switching network and the synchronous rectifier, wherein the driver is of an adjustable bias voltage;
  configuring the switching network to operate a switching frequency higher than a resonant frequency of the resonant tank when the resonant converter is in a startup process; and
  ramping up the adjustable bias voltage during the startup process, wherein during the ramping up the adjustable bias voltage, the adjustable bias voltage increases from zero to a steady bias voltage through a plurality of ramp-up stages.

2. The method of claim 1, wherein:
the switching frequency is about one and a half times the resonant frequency.

3. The method of claim 1,
wherein the adjustable bias voltage increases from zero to a steady bias voltage with a slew rate less than or equal to 1000 mV/us.

4. The method of claim 1,
wherein:
  in a first ramp-up stage, the adjustable bias voltage increases from zero to a turn-on threshold voltage of the switches;
  in a second ramp-up stage, the adjustable bias voltage increases from the turn-on threshold voltage to a Miller-plateau voltage of the switches; and
  in a third ramp-up stage, the adjustable bias voltage increases from the Miller-plateau voltage of the switches to the steady bias voltage.

5. The method of claim 4, wherein:
a first bias voltage slew rate in the first ramp-up stage is approximately equal to a third bias voltage slew rate in the third ramp-up stage; and
the first bias voltage slew rate is greater than a second bias voltage slew rate in the second ramp-up stage.

6. The method of claim 1,
wherein:
  in a first ramp-up stage, the adjustable bias voltage increases from zero to a turn-on threshold voltage of the switches;
  in a second ramp-up stage, the adjustable bias voltage increases from the turn-on threshold voltage to a Miller-plateau voltage of the switches; and
  in a third ramp-up stage, the adjustable bias voltage increases from the Miller-plateau voltage of the switches to the steady bias voltage through a non-linear voltage ramp-up process.

7. The method of claim 6, wherein:
the non-linear voltage ramp-up process comprises an exponential function.

8. The method of claim 1,
wherein in a first ramp-up stage, the adjustable bias voltage non-linearly increases from zero to a turn-on threshold voltage of the switches;
in a second ramp-up stage, the adjustable bias voltage slowly increases from the turn-on threshold voltage to a Miller-plateau voltage of the switches; and
in a third ramp-up stage, the adjustable bias voltage non-linearly increases from the Miller-plateau voltage of the switches to the steady bias voltage.

9. The method of claim 8, wherein:
the first ramp-up stage comprises a plurality of first sub-segments; and
the third ramp-up stage comprises a plurality of third sub-segments.

10. A system comprising:
an input power source;
a switching network comprising:
  a first pair of switches coupled between the input power source; and
  a second pair of switches coupled between the input power source;
a resonant tank connected between the switching network and a primary side of a transformer, wherein the resonant tank comprises:
  a series resonant inductor coupled to the switching network and the transformer; and
  a series resonant capacitor coupled to the switching network and the transformer;
a rectifier coupled to a secondary side of the transformer; and
a driver coupled to the rectifier and the switching network, wherein:
  the driver is of an adjustable bias voltage; and
  the driver is configured to generate gate drive signals for the switching network and the rectifier, and wherein the gate drive signals are of a switching frequency higher than a resonant frequency of the resonant tank during a startup process;
  wherein the adjustable bias voltage is configured to increase from zero to a steady bias voltage through a multiple ramp-up stages.

11. The system of claim 10, wherein:
the switching network, the resonant tank, the transformer and the rectifier form an LLC resonant converter.

12. The system of claim 11, wherein:
the adjustable bias voltage is configured to increase during a startup process of the LLC resonant converter.

13. The system of claim 12, wherein:
in a first ramp-up stage, the adjustable bias voltage linearly increases from zero to a turn-on threshold voltage of the switches;
in a second ramp-up stage, the adjustable bias voltage slowly increases from the turn-on threshold voltage to a Miller-plateau voltage of the switches; and
in a third ramp-up stage, the adjustable bias voltage linearly increases from the Miller-plateau voltage of the switches to the steady bias voltage.

14. The system of claim 12, wherein:
in a first ramp-up stage, the adjustable bias voltage linearly increases from zero to a turn-on threshold voltage of the switches;
in a second ramp-up stage, the adjustable bias voltage slowly increases from the turn-on threshold voltage to a Miller-plateau voltage of the switches; and
in a third ramp-up stage, the adjustable bias voltage non-linearly increases from the Miller-plateau voltage of the switches to the steady bias voltage.

15. The system of claim 10, wherein:
the transformer is a center-tapped transformer; and
the rectifier is a synchronous rectifier.

16. A method comprising:
providing a resonant converter comprising:
  a switching network comprising a plurality of switches;
  a resonant tank coupled between the switching network and a transformer, wherein the resonant tank comprises:
    a series resonant inductor coupled to the switching network and the transformer; and
    a series resonant capacitor coupled to the switching network and the transformer; and
  a driver having an adjustable bias voltage; and
in response to a startup process of the resonant converter, configuring the switching network to operate a switching frequency higher than a resonant frequency of the resonant tank;
wherein the method further comprises increasing the adjustable bias voltage from zero to a steady bias voltage through a plurality of ramp-up stages.

17. The method of claim 16, wherein:
in a first ramp-up stage, the adjustable bias voltage linearly increases from zero to a turn-on threshold voltage of the switches;
in a second ramp-up stage, the adjustable bias voltage slowly increases from the turn-on threshold voltage to a Miller-plateau voltage of the switches; and
in a third ramp-up stage, the adjustable bias voltage linearly increases from the Miller-plateau voltage of the switches to the steady bias voltage.

18. The method of claim 16, wherein:
in a first ramp-up stage, the adjustable bias voltage linearly increases from zero to a turn-on threshold voltage of the switches;
in a second ramp-up stage, the adjustable bias voltage slowly increases from the turn-on threshold voltage to a Miller-plateau voltage of the switches; and
in a third ramp-up stage, the adjustable bias voltage non-linearly increases from the Miller-plateau voltage of the switches to the steady bias voltage.

19. The method of claim 16, further comprising:
coupling the switching network to a dc input power source;
coupling a primary side of the resonant converter and a secondary side of the resonant converter through the transformer;
coupling a rectifier to the secondary side of the transformer; and
coupling an output filter to the rectifier.

* * * * *